3,329,900
PHASE-STABLE RECEIVER EMPLOYING A PHASE-MODULATED INJECTED REFERENCE
Ross E. Graves, Pacific Palisades, Los Angeles, Calif., assignor to TRW Inc., a corporation of Ohio
Filed Nov. 5, 1963, Ser. No. 321,516
15 Claims. (Cl. 325—346)

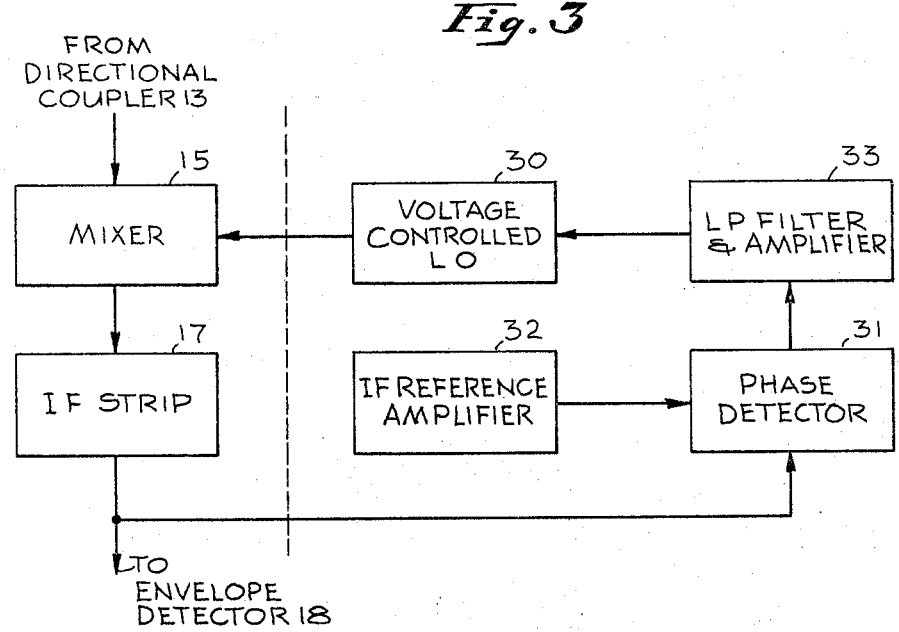
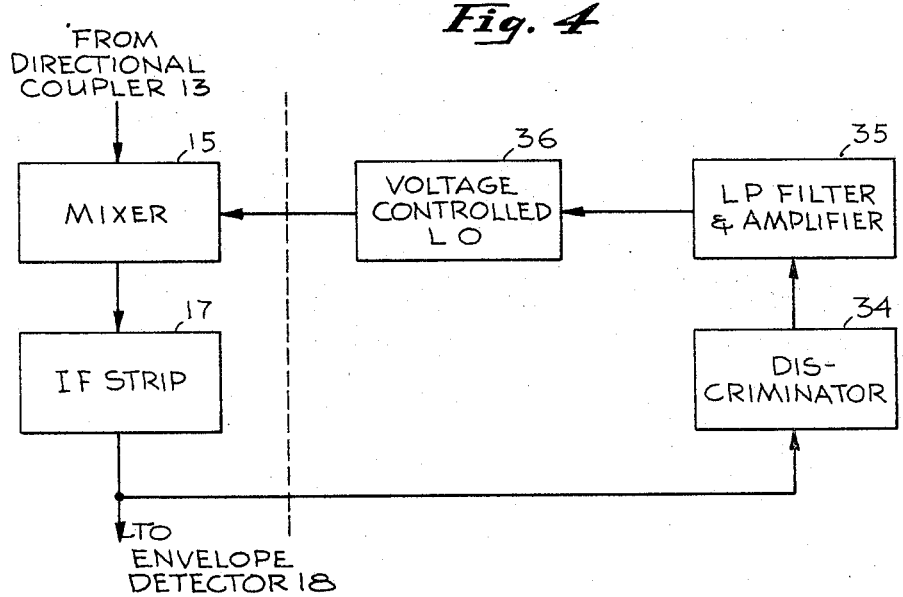
ROSS E. GRAVES
INVENTOR.

ABSTRACT OF THE DISCLOSURE

A receiver wherein a locally generated phase modulated injected reference signal having substantially the same frequency and phase as an incoming phase varying input signal is added with said input signal prior to mixing. The combined sum signal is envelope detected and phase detected against a low frequency modulation oscillator also used to modulate the injected reference signal.

---

This invention relates to a phase stable receiver and more particularly to a phase stable receiver employing a phase modulated injected reference.

Copending application Ser. No. 321,462 filed Nov. 5, 1963, now abandoned, assigned to the common assignee describes a phase detector which is free of the severe balance problems associated with conventional phase detectors for use at extremely high frequencies. The essential feature of the disclosed copending phase detector is the additive injection of a phase-modulated reference into the signal channel, followed by envelope detection of the resultant sum and phase detection of the beat note from the envelope detector against the output of a low frequency modulation oscillator. The balance problem for the microwave, or high frequency, phase detector is then reduced to the corresponding balance problem for a phase detector operated at the modulation frequency. The copending disclosure points out that the phase detector implemented in this manner is very insensitive to phase shifts introduced following the point at which the phase-modulated reference is added to the input signal. For this reason, it is feasible to heterodyne the composite signal plus modulated reference to a convenient intermediate frequency and to amplify this signal in a conventional intermediate frequency amplifier prior to envelope detection without introducing a significant phase error. In addition, it is feasible to perform amplification on the output beatnote from the envelope detector without changing the balance point of the improved phase detector as long as the modulation phase shift introduced in the IF amplifier and in the amplifier following the envelope detector is less than 90 degrees in absolute value; under these circumstances the effect of the modulation phase shift is only to reduce the sensitivity of the improved phase detector by a factor cos $\beta$, where $\beta$ is the modulation phase shift, without affecting the null point.

A noise analysis shows that for the case of a linear envelope detector and a reference signal that is large relative to the input signal, the loss in signal-to-noise performance relative to a conventional phase detector is only 1.7 db when the optimum modulation index of 1.84 radians is employed for phase modulation of the injected reference. These very attractive features provide the basis for a receiver suitable for use in precision CW ranging and interferometric tracking and guidance systems.

The present invention is concerned with a phase stable receiver employing the basic phase detecting system disclosed in the referenced copending application. In this invention there is disclosed an automatic gain control which control is clearly essential if a precision phase-tracking receiver is to function over a useful dynamic range.

For many receiver applications the phase data which are desired will be the phase of the difference frequency between two microwave carriers rather than the phase of the carrier itself. This difference frequency signal constitutes a subcarrier which may be thought of as a single-sideband subcarrier on a single carrier frequency thereby making it immaterial which of the two received sinusoidal signals is conceived to be the carrier and which the single-sideband subcarrier. The basic problem in implementing a phase-stable receiver for reception of signals of the sort described is that of achieving adequate stability in reception of a single carrier which case only will be described in detail since reception of the subcarrier in phase-stable fashion is effected by means of a dual-channel receiver, in which each channel tracks one of the received sinusoidal signals. The difference frequency or subcarrier is then extracted by a simple mixing process which is described and claimed in copending application Ser. No. 237,229 filed Nov. 13, 1962, now Patent No. 3,308,380, and assigned to the same common assignee.

Further objects and advantages will be made more apparent by referred now to the accompanying drawings where:

FIG. 3 is a block diagram illustrating IF centering with a phase locked loop; and FIG. 4 is a block diagram illustrating IF centering with a frequency locked loop;

Figure 1:
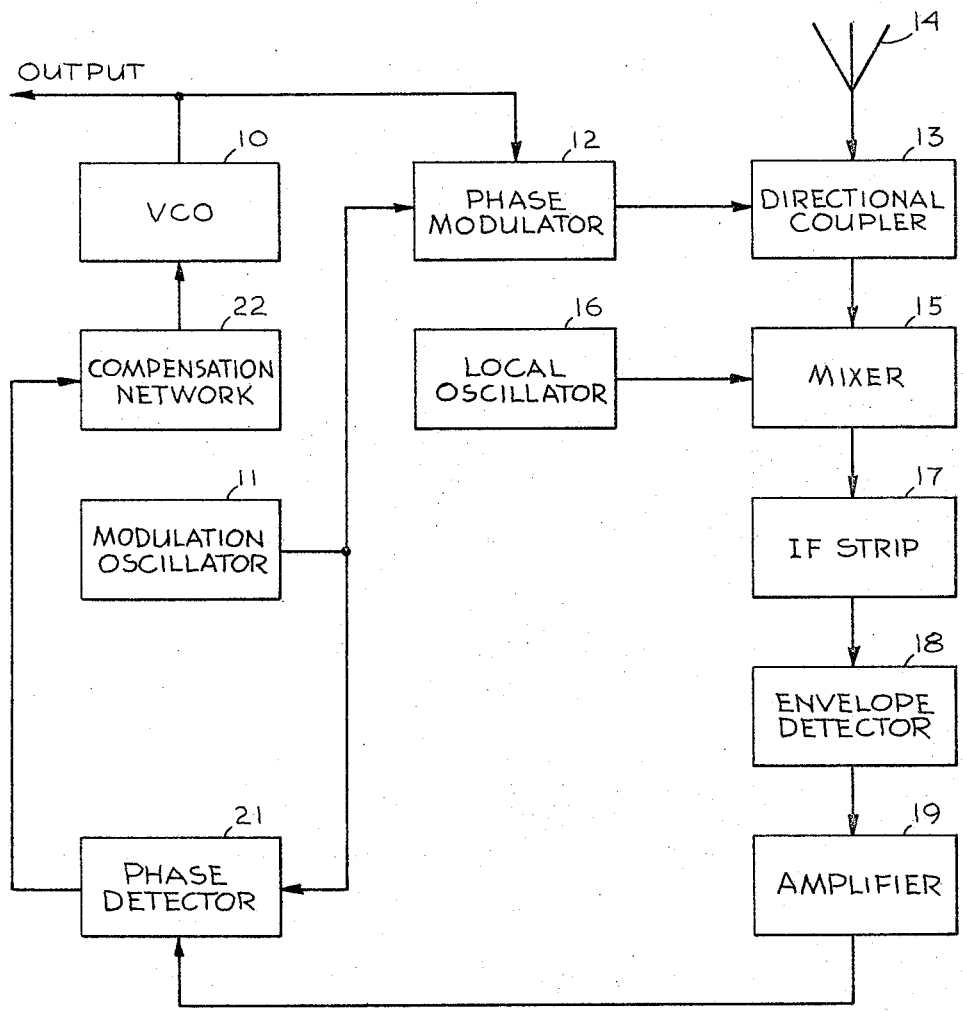
FIG. 1 is a block diagram illustrating the basic phase locked receiver employing a phase modulated injected reference.

Referring now to FIG. 1, there is shown a microwave phase-stable receiver employing a phase-modulated injected reference signal. The disclosed receiver is a null type system in which a locally generated reference signal is controlled in frequency and phase to be substantially equal to the frequency varying incoming signal having the unknown phase. A voltage controlled oscillator (VCO) 10 generates the defined reference signal. A modulation oscillator 11 which may have a frequency in the audio range phase modulates the output of the VCO 10 in a phase modulator 12. The phase modulated reference signal is combined additively with an input signal in a suitable combining circuit which, for the microwave receiver illustrated, may be a directional coupler 13. The input signal feeding the directional coupler would normally be received by suitable antenna means 14. The combined output signal from the directional coupler 13 is heterodyned to a suitable intermediate frequency (IF) by combining the output signal in a mixer 15 with a signal generated in a local oscillator 16. The IF signal from the mixer 15 is conveniently amplified in an IF strip 17 which feeds an envelope detector 18. The output of the envelope detector 18 is a signal having the same frequency as that generated by the modulation oscillator 11. The sense and amplitude of the component of the envelope detector output at the modulation frequency provides the information about the phase of the input signal relative to the unmodulated reference signal. The envelope detected signal is amplified by an amplifier 19 and fed to a phase detector 21 which generates an output signal in response to the phase difference between the envelope detected signal from amplifier 19 and the modulation signal generated by the modulation oscillator 11. The output voltage is fed to a compensation network 22 which produces a DC voltage for controlling the frequency of the VCO 10.

The phase detector 21 has incorporated within it a phase shift network to provide approximate compensation for any extraneous phase shifts between the signal from the amplifier 19 following the envelope detector 18 and the signal from the modulation oscillator 11. Should the phase detector 21 not be a perfect product multiplier it will, in general, be necessary to incorporate a filter in the signal channel following the envelope detector 18 to pass only the fundamental component of the modulation frequency to the loop phase detector in order to avoid biasses introduced by harmonics of the output from the modulation oscillator beating with harmonics of the modulation frequency in the signal channel.

The output of the receiver is taken from the VCO 10 at a point prior to the phase modulator 12. The VCO 10 may be either a microwave oscillator or a crystal-controlled oscillator followed by a multiplier chain to multiply the frequency to the frequency of the received input signal. In practice a crystal controlled oscillator followed by a frequency multiplier chain would usually be employed because of the improved frequency and phase stabilities which are possible with this configuration. In this case, the output signal may be taken from the crystal oscillator output directly or at some intermediate point in the multiplier chain. If the output is taken from such an intermediate point, the phase modulator 12 may be conveniently inserted in the multiplier chain following this point rather than being required to operate directly at the signal frequency. If it is desired to place the phase modulator in the reference channel directly at the signal frequency, this may be done by employing a ferrite phase modulator for this purpose. In any case, whether the unmodulated output is taken at the signal frequency or at some intermediate point in a frequency multiplier chain, additional frequency conversion and processing will normally be required to make use of the phase data.

The injected reference signal from the VCO 10 is normally made larger than the greatest signal with which the receiver is intended to receive from antenna 14. In fact, the reference power should be large relative to the total signal-plus-noise power in the receiver. In this way, the reference effectively establishes the operating points of the mixer 15, the intermediate frequency strip 17, and the envelope detector 18. Moreover, when the reference power is large relative to the combined signal-plus-noise power, the effect of noise-cross-noise products on the output signal-to-noise ratio is minimized. The phase characteristics of the mixer 15 and the intermediate frequency strip 17 are relatively unimportant as long as they are linear across a band sufficient to accommodate the lower harmonics of the modulation spectrum on the injected reference.

The compensation network 22 is essentially a low-pass filter and amplifier arranged to provide compensation for tracking frequency ramps, which correspond to vehicle accelerations, parabolic frequency changes, which correspond to jerks in an accelerating source, or such other dynamic characteristics as are anticipated for the source. This compensation, which consists basically of the introduction of additional orders of integration, is necessary in order that the reference signal phase does not contain an error caused by dynamic lag in the tracking loop. This problem is sufficiently familiar to those skilled in the art that detailed explanation is not warranted here. It is necessary, however, to design the compensation network 22 properly to avoid phase errors in the loop caused by dynamic lag when the receiver is tracking a signal having the characteristics with which it is designed to operate.

Figure 2:
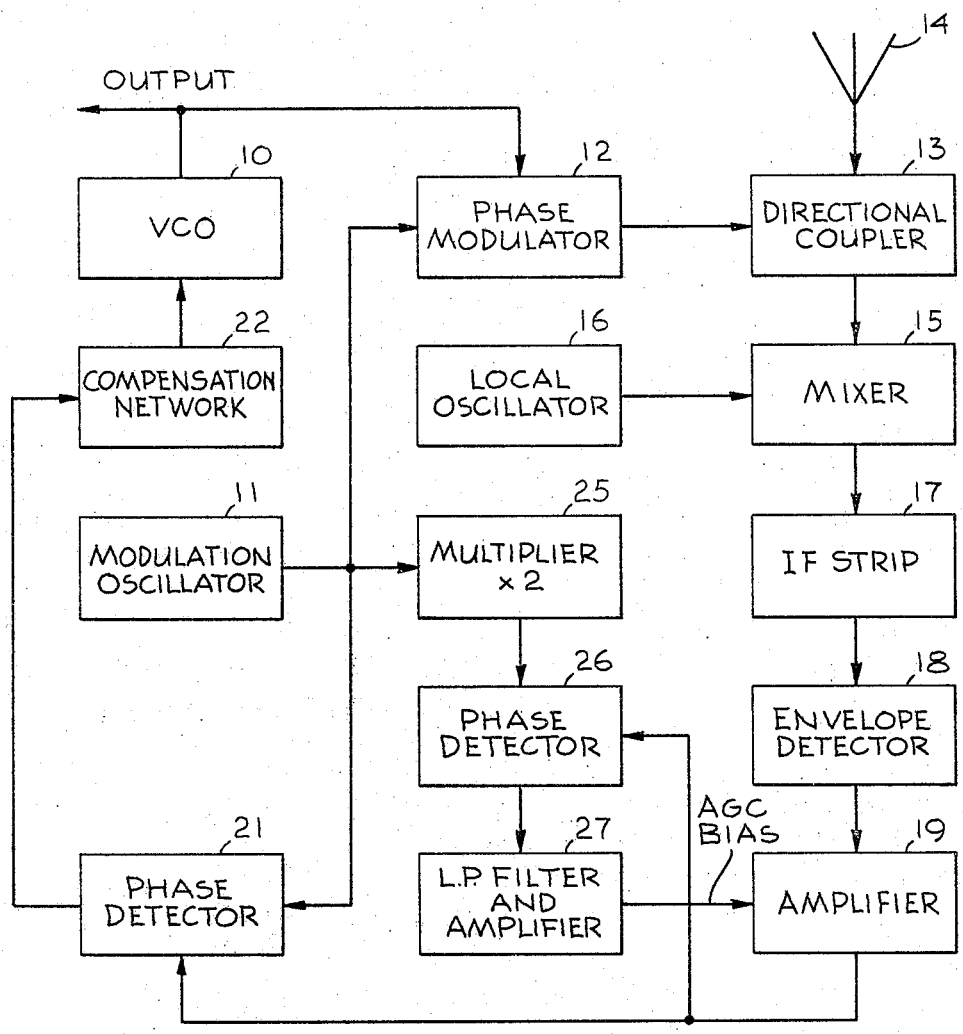
FIG. 2 is a block diagram of a phase locked receiver employing coherent second harmonic automatic gain control (AGC)

Referring now to FIGURE 2, there is shown a phase locked receiver using a phase modulated injected reference and second harmonic automatic gain control (AGC). Similar numbers have been used for those items having identical functions. Automatic gain control is difficult to implement in the receiver illustrated in FIGURE 1 in the conventional manner because the fundamental component of the envelope detector 18 output, which is compared with the modulation oscillator 11 phase in the low frequency phase detector whose output is employed to control the VCO, has the property that it vanishes when the reference is in phase or in anti-phase with the received signal. This feature is more fully described in the first mentioned copending application. That is, the action of the receiver of FIGURE 1 is to null the fundamental component of the modulation frequency from oscillator 11 at the output of the envelope detector 18. For this reason, any attempt to normalize the amplitude of the fundamental component of the envelope detector output will destroy the proper functioning of the phase-locked loop. The function of the automatic gain control loop, or the limiter, usually employed with a phase-locked receiver is to maintain the phase-locked loop gain at a substantially constant value and in particular, to achieve this objective by holding the phase detector sensitivity, in volts per radiant, substantially constant. This same objective is achieved in the receiver illustrated in FIGURE 2 by implementing the automatic gain control in such a fashion as to hold the amplitude of the second harmonic of the modulation frequency from oscillator 11, as seen at the output of the amplifier 19 following the envelope detector 18, at a constant value. This is implemented by multiplying the modulation signal frequency from the oscillator 11 by a factor of 2 times in a multiplier 25. The output of the multiplier 25 feeds a phase detector 26 which generates an output signal in response to the phase difference between the multiplied modulation signal ($\times 2$) and the output signal from the amplifier 19 which will have a component with a frequency of two times the modulation signal frequency when the input signal and the modulation signal are in phase.

The output of the phase detector 26 is fed to a low pass (L.P.) filter and amplifier 27 which generates a bias voltage for controlling the gain of amplifier 19. This method of effecting AGC action may be appreciated by realizing that, when the reference signal from the VCO 10 is nearly in phase (or in anti-phase) with the input signal, the amplitudes of the fundamental and the second harmonic of the modulation frequency at the output of the amplifier 19 following the envelope detector 18 will vary together with receiver gain and that the second harmonic amplitude will be insensitive to small variations in the reference phase relative to the signal phase. The insensitivity of the second harmonic to small variations in the reference phase relative to the signal phase follows from the fact that the second harmonic amplitude is an even function of the phase difference between the reference and the signal, together with the fact that the second harmonic does not vanish when the signal and the reference are in phase (or in anti-phase). The characteristics of the amplitudes of the fundamental and the second harmonic at the output of the envelope detector have been mathematically analyzed to substantiate these remarks.

It can be seen therefore that any method of sensing the amplitude of the second harmonic of the modulation frequency at the output of the amplifier 19 following the envelope detector 18 may be employed for AGC purposes. However, the most attractive method is to employ coherent AGC as shown in FIGURE 2, since coherent AGC permits excellent control characteristics even for extremely weak signals. The second harmonic phase detector 26 has incorporated within it a phase shift network to bring the second harmonic of the modulation oscillator output from multiplier 25 into approximate phase coincidence with the second harmonic of the modulation frequency from the envelope detector 18, after passage through the output amplifier 19. Since the second harmonic phase detector may not be a perfect product multiplier, it may be necessary to incorporate a filter in the signal channel prior to the second harmonic (AGC) phase detector 26 to pass only the second harmonic of the modulation frequency to this phase detector to avoid biasses introduced by multiples of the second harmonic from the modulation oscillator beating with harmonics of the modulation frequency in the signal channel. Normally, the AGC is effected by controlling the gain of the amplifier on the envelope detector output. If additional AGC dynamic range is required, some control may be exercised over the gain of the IF strip 17. Controlling the gain of the IF strip 17 has the disadvantage that the operating points of the IF strip and the envelope detector 18 would no longer be held invariant. If the variable phase shifts introduced in the detector output amplifier 19 by AGC action do not exceed, say 30 degrees, the operation of the AGC loop will be essentially unaffected and the same will be true for the phase-tracking loop.

Certain modifications of the basic receivers illustrated in FIGURES 1 and 2 are possible to enhance the operational usefulness of the device. A first modification involves the use of an RF pre-amplifier that may be employed without introducing phase errors provided that it is introduced at a point between the directional coupler 13, at which the modulated reference signal is injected, and the first mixer 15. The requirements on the phase stability and characteristics of a pre-amplifier introduced at this point are entirely similar to those, described previously, on the intermediate frequency amplifier 17 following the mixer 15. If a low-noise RF pre-amplifier is employed, it will be necessary to mismatch the reference arm of the directional coupler 13 in order to obtain the lowest possible noise figure for the receiving system. This mismatch will prevent coupling through the reference channel junction to the local thermal environment. Simultaneously, this mismatch in the reference arm will preclude the loss of appreciable signal energy through the reference port. The penalty for this mismatch is simply to require a somewhat larger amount of injected reference power prior to the coupler. It should be observed that no intermediate frequency need be employed if the gain of the radio frequency amplifier is made sufficiently great so that the amplifier noise is large relative to the noise generated in the envelope detector 18.

Referring now to FIGURES 3 and 4 there is illustrated a first and second embodiment of a second modification for automatically centering the composite signal-modulated-reference in the IF passband. In the normal phase-locked receiver, this centering is effected automatically by the action of the phase-tracking loop. Since no such automatic centering occurs in the case of the receiver here described, some provision for signal centering is made in the case where large Doppler frequencies must be accommodated without an inordinate increase in the intermediate frequency bandwidth.

FIGURE 3 illustrates a first technique for phase-locking a voltage controlled local oscillator 30 so that its frequency differs from the input signal received from the directional coupler 13 by the desired intermediate frequency. The output signal from the IF strip 17 feeding the envelope detector 18 is also fed to a phase detector 31 which compares the phase difference between the aforementioned IF signal and a signal generated at the intermediate frequency by a free running IF reference oscillator 32. The output signal from the phase detector 31 is integrated and filtered in an L.P. filter and amplifier 33 which is used to keep the frequency generated by the voltage controlled local oscillator 30 offset from the input frequency by an amount equal to the intermediate frequency. Here the phase-lock is actually effected primarily by the carrier component of the modulated injected reference signal, since this signal will normally be much larger than the received signal. No AGC is necessary in this subsidiary phase-locked loop since the reference amplitude is constant. Some care is necessary with this method to assure that the local oscillator is phase-locked to the carrier of the injected reference rather than to one of its modulation sidebands. Actually, unless very precise frequency centering is essential, a phase-lock to one of the low order modulation sidebands would not be particularly serious for most applications.

FIGURE 4 illustrates a second technique for centering the signal in the IF strip 17 and is probably the simplest and most appealing of all. A discriminator 34 is located at the output of the IF strip 17. The output of the discriminator 34 after being suitably filtered in a low pass filter and amplifier 35 is used to control the frequency of a voltage controlled local oscillator 36. Since the reference signal plays the role of the signal input to the discriminator 34 and since the reference signal is large relative to both the received signal and the noise in the IF strip 17, the discriminator 34 will be operating above its threshold, so that no problems from this source will be encountered. As with the case of the phase-lock technique described in FIGURE 3, the fact that the reference amplitude is constant implies that no AGC is required in the discriminator control loop. The bandwidth of the discriminator loop should be sufficiently small so that the loop does not follow the modulation on the injected reference. Actually, some LO frequency jitter produced by this modulation should do no harm inasmuch as its effects would be removed in the envelope detector and hence would not reflect into the operation of the basics phase-tracking loop and its associated AGC circuitry. The discriminator control loop has the additional advantage that it will pull in over a very wide frequency range, unlike the phase-locked loop described for this purpose in the preceding paragraph. Since the discriminator frequency control loop simply forces the local oscillator frequency to follow the injected reference frequency, the use of this auxiliary loop will have no effect on the acquisition procedure employed with the basic phase-locked receiver.

One of the most straight forward methods of centering the received signal in the IF bandpass is to make use of the reference signal generated by the receiver itself for this purpose. This can be done by mixing the reference with a signal at the desired intermediate frequency and filtering to retain only the upper sideband or the lower sideband. The offset unmodulated reference is then used as the local oscillator signal. Extreme care must be taken if this technique is employed, to assure that no signal at the reference frequency exists in this LO signal since the beat between the desired LO signal and any residual reference, produced in the mixer, will give rise to a spurious signal at the intermediate frequency. In the same manner, the beat between the true reference signal in the input channel and an undesired sideband would produce a spurious signal at the intermediate frequency. While the danger of self-locking which is usually present in phase-locked receivers when a spurious signal is introduced into the IF strip is very considerably alleviated by the modulation technique here employed, the presence of such a signal can produce a significant phase error. If the reference signal is generated by means of a crystal oscillator and a frequency multiplier chain, the bulk of the Doppler offset can be eliminated by multiplying the oscillator output by a factor different from that which is necessary to obtain the reference signal, where the difference is equal to the desired intermediate frequency. This technique also requires extreme care to avoid the introduction of spurious signals.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein, except as defined by the appended claims.

The embodiments of the invention in which an exclusive property or privilege is claimed are defined as follows:

1. In combination, means for receiving an input frequency varying signal,
modulating signal means for phase modulating a reference signal source having substantially the same frequency as said input signal at a rate that is substantially low compared to the reference signal frequency,
means for combining the phase modulated reference signal with said incoming signal whereby said combined signal contains the unknown phase of said incoming signal,
means for envelope detecting said combined signal containing the unknown phase of said incoming signal, and phase detecting means for measuring the phase difference between the component of said envelope detected signal at said modulation frequency and said modulating signal means,
said phase detecting means generating an output signal for controlling the frequency and phase of said reference signal source whereby said reference signal varies as said input signal varies.

2. A combination according to claim 1 in which said means for combining is a directional coupler having a deliberate mismatch of the reference port receiving said reference injected signal.

3. A combination according to claim 1 which includes a pre-amplifier between said combining means and said detecting means whereby phase error is not introduced into the system.

4. In combination,
means for receiving an input frequency varying signal,
a controllable reference signal source having substantially the same frequency as said input signal,
a modulation signal source having a frequency that is substantially low compared to said reference signal frequency for phase modulating said reference signal,
means for additively combining said phase modulated reference signal with said incoming signal,
means for envelope detecting said combined signal,
phase detecting means for measuring the phase difference between the component of said envelope detected signal at said modulation frequency and said modulating signal source,
and means for controlling the frequency and phase of said reference signal source by said phase detecting means whereby said reference signal is at the frequency and phase of said input signal.

5. In combination,
means for deceiving an input frequency varying microwave signal,
a voltage controllable reference signal source having substantially the same frequency as said input signal,
a modulation signal source having a frequency that is substantially low compared to said reference signal frequency for phase modulating said reference signal,
means for additively combining said phase modulated reference signal with said incoming signal in a directional coupler,
means for heterodyning said combined signal to an intermediate frequency signal,
means for envelope detecting said intermediate frequency signal to obtain the modulation signal frequency,
phase detecting means for measuring the phase difference between the component of said detected modulation signal at the modulation frequency and said modulating signal source, and
means for controlling the frequency and phase of said reference signal source by said phase detecting means whereby said reference signal is at the frequency and phase of said input signal.

6. A combination according to claim 5 in which said detected modulation signal frequency is amplified after being detected.

7. A combination according to claim 5 in which said modulation signal frequency is in the audio range.

8. In combination,
means for receiving an input frequency varying signal,
a controllable reference signal source having substantially the same frequency as said input signal,
a modulation signal source having a frequency that is substantially low compared to said reference signal frequency for phase modulating said reference signal,
means for additively combining said phase modulated reference signal with said incoming signal,
means for envelope detecting said combined signal,
means for detecting the second harmonic of the modulation signal from said envelope detected signal,
means for controlling the gain of said envelope detected signal in response to said detected second harmonic signal,
phase detecting means for measuring the phase between the component of said envelope detected signal at said modulation frequency and said modulating signal means,
and means for controlling the frequency and phase of said reference signal source by said phase detecting means whereby said reference signal is at the frequency and phase of said input signal.

9. In combination,
means for receiving an input frequency varying signal,
a controllable reference signal source having substantially the same frequency as said input signal,
a modulation signal source having a frequency that is substantially low compared to said reference signal frequency for phase modulating said reference signal,
means for additively combining said phase modulated reference signal with said incoming signal,
means for envelope detecting said signal,
means for coherently detecting the second harmonic of the modulation signal from said envelope detected signal with respect to said modulation signal and generating an AGC signal in response thereto,
means for controlling the gain of said envelope detected signal in response to said AGC bias signal,
phase detecting means for measuring the phase between the component of said envelope detected signal at said modulation frequency and said modulation signal means,
and means for controlling the frequency and phase of said reference signal source by said phase detecting means whereby said reference signal is at the frequency and phase of said input signal.

10. In combination,
means for receiving an input frequency varying signal,
a controllable reference signal source having substantially the same frequency as said input signal,
a modulation signal source having a frequency that is substantially low compared to said reference signal frequency for phase modulating said reference signal,
means for additively combining said phase modulated reference signal with said incoming signal,
means for envelope detecting said signal,
means for detecting the second harmonic of the modulation signal from said envelope detected signal,
means for multiplying the frequency of said modulation signal by a factor of two,
means for phase comparing said multiplied modulation signal against said detected second harmonic signal to thereby generate an AGC bias signal,
means for controlling the gain of said envelope detected signal in response to said AGC bias signal,
phase detecting means for measuring the phase difference between the component of said enevelope detected signal at the modulation frequency and said modulation signal, and means for controlling the frequency and phase of said reference signal source by said phase detecting means whereby said reference signal is at the frequency and phase of said input signal.

11. In combination, means for receiving an input frequency varying signal, a controllable reference signal source having substantially the same frequency as said input signal, a modulation signal source having a frequency that is substantially low compared to said reference signal frequency for phase modulating said reference signal, means for additively combining said phase modulated reference signal with said incoming signal, means for heterodyning said combined signal to produce an intermediate frequency signal, amplifying means for amplifying said intermediate frequency, means for centering said intermediate frequency signal in said amplifying means, means for envelope detecting said intermediate frequency signal, phase detecting means for measuring the phase between the component of said envelope detected signal at said modulation frequency and said modulation signal means, and means for controlling the frequency and phase of said reference signal source by said phase detecting means whereby said reference signal is at the frequency and phase of said input signal.

12. In combination, means for receiving an input frequency varying signal, a controllable reference signal source having substantially the same frequency as said input signal, a modulation signal source having a frequency that is substantially low compared to said reference signal frequency for phase modulating said reference signal, means for additively combining said phase modulated reference signal with said incoming signal, means for heterodyning said combined signal with a voltage controlled local oscillator generated signal to produce an intermediate frequency signal, means for generating an error signal in response to frequency deviations of said intermediate frequency signal, said error signal controlling the centerline frequency of said voltage controlled local oscillator, means for envelope detecting said intermediate frequency signal, phase detecting means for measuring the phase between the component of said envelope detected signal at the modulation frequency and said modulation signal, and means for controlling the frequency and phase of said reference signal source by said phase detecting means whereby said reference signal is at the frequency and phase of said input signal.

13. A combination according to claim 12 in which said means for generating an error signal comprises a frequency sensitive discriminator for controlling the frequency generated by said voltage controlled local oscillator.

14. A combination according to claim 13 which includes means for coherently detecting the second harmonic of the modulation signal from said envelope detected intermediate frequency signal with respect to said modulation signal and generating an AGC signal in response thereto, means for controlling the gain of said envelope detected intermediate frequency signal in response to said AGC bias signal.

15. In combination, means for receiving an input frequency varying signal, a controllable reference signal source having substantially the same frequency as said input signal, a modulation signal source having a frequency that is substantially low compared to said reference signal frequency for phase modulating said reference signal, means for additively combining said phase modulated reference signal with said incoming signal, means for heterodyning said combined signal with a voltage controlled local oscillator generated signal to produce an intermediate frequency signal, an oscillator free running at said intermediate frequency, means for phase detecting the difference between said heterodyned intermediate frequency signal and said oscillator generated intermediate frequency signal, the output of said phase detecting means controlling the frequency of said voltage controlled local oscillator, means for envelope detecting the output of said intermediate frequency amplifier, phase detecting means for measuring the phase between the component of said envelope detected signal at the modulation frequency and said modulation signal, and means for controlling the frequency of said reference signal source by said phase detecting means whereby said reference signal is at the frequency and phase of said input signal.

No references cited.

KATHLEEN H. CLAFFY, *Primary Examiner.*

WILLIAM C. COOPER, *Examiner.*

R. S. BELL, *Assistant Examiner.*